United States Patent [19]
Rebours

[11] 3,733,789
[45] May 22, 1973

[54] GAS-LIQUID CONTACTING APPARATUS FOR SEPARATING MICROMISTS FROM A CARRIER GAS

[75] Inventor: Albert Rebours, Chatou, France

[73] Assignee: Prat-Daniel-Poelman, Courbevoie, France

[22] Filed: Mar. 13, 1972

[21] Appl. No.: 233,886

Related U.S. Application Data

[63] Continuation-in-part of Ser. No. 48,943, June 22, 1970, abandoned, which is a continuation of Ser. No. 736,832, June 13, 1968, abandoned.

[52] U.S. Cl. .................................... 55/233, 55/240
[51] Int. Cl. ................................................ B01d 47/00
[58] Field of Search.................... 55/71, 73, 89, 90, 55/93, 233, 234, 240, 378; 261/100, 105, 106

[56] References Cited

UNITED STATES PATENTS

| | | | |
|---|---|---|---|
| 2,947,383 | 8/1960 | Schytil et al. | 55/90 |
| 3,142,548 | 7/1964 | Krantz | 55/233 |
| 3,170,007 | 2/1965 | Krantz | 55/241 |
| 3,370,401 | 2/1968 | Lucas et al. | 55/90 |
| 3,387,433 | 6/1968 | Mackey | 55/378 |
| 3,412,531 | 11/1968 | Schwab | 55/378 |

*Primary Examiner*—Charles N. Hart
*Attorney*—Erich M. H. Radde

[57] ABSTRACT

A gas-liquid contacting apparatus particularly adapted for the separation and precipitation of microparticulate liquid micromists from a carrier gas comprising filters made of filter cloth through which the gas is forced to pass. The filters are preferably of tubular or bag-like form and may consist of single or multiple filter cloth layers, if required, with felted or tangled fibers placed as intermediate layer between two filter cloth layers. The filters are attached to the gas inlet compartment by specific collars which permit rapid removal and exchange. By providing a special extension piece or counterweight at the lower part of the filter a gas seal is formed at the bottom of the apparatus housing. The filters are continuously provided during filtration with a liquid washing layer forming a microsieve for intercepting the liquid micromists contained in the carrier gas.

4 Claims, 7 Drawing Figures

3,733,789

SHEET 1 OF 4 v = Apparent Speed of Passage of Air through a Filter Cloth Layer

Δp = Loss of charge mm CE

GAS-LIQUID CONTACTING APPARATUS FOR SEPARATING MICROMISTS FROM A CARRIER GAS

CROSS-REFERENCE TO RELATED APPLICATIONS

This application is a continuation-in-part of copending application Ser. No. 48,943, entitled "GAS-LIQUID CONTACTING APPARATUS, PARTICULARLY FOR SEPARATING MICROMISTS AND FINE DUST FROM A CARRIER GAS, AND PROCESS," said application being filed on June 22, 1970 as a streamlined continuation application of application Ser. No. 736,832 entitled "GAS-LIQUID CONTACTING APPARATUS, PARTICULARLY FOR SEPARATING MICROMISTS AND FINE DUST FROM A CARRIER GAS, AND PROCESS" filed on June 13, 1968 and both now abandoned.

BACKGROUND OF THE INVENTION

1. Field of the invention

The present invention relates to the precipitation and separation of micromists and more particularly to highly effective gas-liquid contacting apparatus serving as filters for the separation and precipitation of micromists from a carrier gas.

2. Description of the Prior Art

It is particularly difficult to separate micromists of chemical or thermal origin which are produced by certain industrial operations, from carrier gases when the liquid particles contained in said mists are of submicroscopic dimensions. Such mists are aggressive or corrosive when of acid nature, and thus dangerous to the environment. Alternatively, such mists may form condensation nuclei in humid weather, thus tending to increase or aggrevate any natural mist that may be present in the atmosphere. The liquid particles suspended in such a mist are usually smaller than 1 micron; the average size, depending on the conditions for the formation of the mists, is generally between 0.1 and 0.2 microns.

Such a mist of chemical or thermal origin is distinguished from mist of mechanical origin formed by mechanically spraying of liquids being usually between 10 microns and 1,000 microns depending upon the mechanical energy of spraying involved.

There, therefore, is a fundamental difference in the size of the particles of the two families of mists, and while simple and economical methods of intercepting such mechanical mists are known, this is not true of the separation of thermal and chemical micromists from carrier gases requiring the use of very costly processes and equipment such as electrostatic separators or high-energy venturis.

Various techniques have already been proposed for eliminating these micro-particulate mists, referred to also as micromists, among which reference may be made to electrostatic separators which are very complicated where the mist is acid in nature. Venturi washers and apparatus for passing the mist over moistened fibers have also been suggested for this purpose. However, the two last named methods have proved to be rather inefficient.

Krantz in U.S. Pat. No. 3,142,548 discloses a process of wet-cleaning dust-laden gases by agglomeration of the dusts by means of drops of water injected into the gases. These drops are relatively large since they are obtained by the action of the stream of gas on the film of water which spreads out in the convergent portion of the apparatus and which is atomized at the point of the constriction (6 b) of the venturi by the gases which pass therethrough at high speed. It is known that the fineness of the drops obtained in a conventional venturi of the type disclosed by Krantz ranges between 100 $\mu$ and 500 $\mu$. Thus such mechanically produced drops are 500 to 1,000 times larger than the particles of submicronic mists. Wetting and agglomerating of the dust particles contained in the gases are effected by Krantz in the diffuser (8). Filter cartridge (9) is provided to retain the dust particles which have been agglomerated by said drops.

Although the material used for cylindrical cartridge (9) is not given, it is well known in the art of industrial dust removal that such cartridges cannot be of cloth for the following reasons:

Filter cloth when used for intercepting dust particles can operate only with velocities of the order of 1 to 4 cm./sec. while the conventional cartridges designed by compacting of fibers of any kind can operate with velocities 50 times greater than is possible with filter cloth. Thus, the filter mat of Krantz can only be a cartridge of compacted fiber.

Furthermore, at the level of the neck of the venturi, the speed of the gases is generally between 30 and 80 m./sec. At the outlet of the diffuser this speed is reduced to about 15 m./sec. Therefore, the surface of the cartridges must be seven to eight times larger than its entrance section. Thus the height of the cartridge is usually equal to 1½ times its diameter.

When replacing the cartridge by a cloth sleeve which operates at a speed of the order of 2 cm./sec., the height of the sleeve would be 100 times greater than that of the cartridge, i.e., equal to 150 times its inner diameter. It is evident that cloth sleeves are not suitable for wet-cleaning dust-laden gases.

Another reason why filter cloth cartridges cannot be used in the KRANTZ apparatus is that it is designed to intercept dust particles. A cloth filter would unfailingly become clogged after a few hours of operation.

U.S. Pat. No. 2,947,383 of Schytil et al. is concerned with the filtration of micromists through cartridges which consist of wettable porous ceramic filter of a special configuration, namely of bonded granules, and of a pore diameter larger than the smallest particles of the mist to be collected. The cartridges serve for agglomerating micromist. The large drops formed on the outer surface of the cartridge are intercepted by a simple baffle or centrifugal system located downstream of the cartridges. Since submicronic mists are rarely in pure state but always contain fine dusts in larger or smaller amounts, such ceramic or sintered material cartridges are thus exposed to rapid clogging in depth. Thus no fully satisfactory gas-liquid contacting apparatus and method for continuously and substantially completely removing micromists from gases containing same are available to the art.

SUMMARY OF THE INVENTION

It is one object of the present invention to provide a gas-liquid contacting apparatus serving as a filter for micromists, that is efficient even in continuous operation, whatever be the nature of the mist, but which nevertheless is relatively uncomplicated.

Another object of the present invention is to provide a simple and effective process of removing micromists and the like from gases carrying the same by means of such gas-liquid contacting apparatus.

Other objects of the present invention and advantageous features thereof will become apparent as the description proceeds.

In principle, the present invention consists in providing a gas-liquid contacting apparatus, particularly for separating micromists from a carrier gas containing same. Said apparatus comprises a chamber for receiving the gases to be purified. Said receiving chamber has attached to its bottom outlet one or more filtering sleeves which are traversable by the gases passing from their inside sleeves to their outside. The filtering sleeves extend downwardly at their lower ends into a bottom compartment or reservoir which is filled with a suitable liquid and serves to receive the recovered micromist collected by the filter sleeves. According to the present invention the filter sleeves are made of filter cloth and their inner walls are continuously sprayed and moistened by a washing liquid which is injected into the gas by means of one or more atomizers provided in the duct through which the gas is passed into the receiving chamber or, preferably, in the receiving chamber itself.

Thus the process of filtration according to the present invention comprises in principle the use of filtering sleeves made of filter cloth which is continuously sprayed during filtration to completely cover its surface. As a result thereof micromists of thermal and/or chemical origin, i.e., of liquid particles which are smaller than 1 $\mu$ are filtered out. Usually the pores of the filter cloth have a pore diameter of at least 40–50 $\mu$. Despite this great difference between the size of the particles to be intercepted and the dimensions of the pores, surprisingly the effectiveness of the filter cloth filtering sleeves of this invention is close to 100 percent.

To achieve this result, it is necessary to spray the surface of the filter cloth continuously with a liquid in an amount of at least about 0.5 kg./cu.m. and preferably in an amount of 6 kg./cu.m. to 8 kg./cu.m. of gas treated, i.e., with amounts which are up to 400 times greater than the amount of micromist present in the gas. The liquid film produced in this manner on the surface of the filter cloth which is continually removed, behaves as a true liquid microsieve. In contrast to the known dry filter cloth filtering elements which, for instance, intercept a mist of phosphoric acid only in the order of 10 percent, the effectiveness of a filter cloth filtering element is increased to more than 99 percent when continuously sprayed and wetted with amounts of washing liquid from at least 0.5 kg./cu.m. of gas up to 10 kg./cu.m. of gas so as to form a continuous stable liquid film on the filter cloth.

On applying the process and apparatus of the present invention for intercepting liquid micromists on a large scale by means of filter cloth filtering elements which are continuously sprayed with a liquid to form a permanent liquid film thereon which film behaves like a liquid microsieve with openings variable according to the rate of flow of the gas, the liquid micromist particles are removed from the gas at a rate of almost 100 percent while the speed of filtration of the gas ranges from 0.3 cm./sec. to 3.0 cm./sec. with an optimum between about 1 cm./sec. and 1.5 cm/sec., when using a single filter cloth, and between 2 cm./sec. and about 10 cm./sec., when using a filtering element composed of two superposed sleeves of filter cloth. In the latter case not only a permanent continuous liquid film is formed on the surface of the inner filter cloth sleeve, but such a stable liquid film serving as a liquid microsieve is also formed between the two layers of filter cloth.

As stated above, the apparatus according to the present invention for separating thermal or chemical micromists is characterized by a housing or casing with an inlet compartment for the gas carrying the micromist, a textile filter composed of filter cloth tightly affixed to an outlet opening in the lower part of said inlet compartment and extending downwardly therefrom, said outlet opening allowing the gas carrying the micromist to enter the filter and to pass therethrough from the inside to the outside, the inner wall of said filter being provided with a liquid layer serving as microsieve liquid layer preferably being produced by atomizing a suitable liquid such as water by means of a spray nozzle, preferably in axial direction and concurrently with the gas stream, a bottom compartment in said housing for collecting the precipitated micromist and the washing liquid, an outlet for said liquid, and an outlet for the purified gas separated from its mist particles.

According to a preferred embodiment of the present invention the filter cloth is provided in the form of a hose of tubular shape which is extended downwardly into the bottom compartment and is connected to a gas-impermeable short piece of pipe so as to form a hydraulic gas seal in said bottom compartment. Furthermore the outlet from the bottom compartment is constructed in the form of a syphon.

According to another embodiment of the present invention the filter cloth is provided in the housing in the form of bag filters preferably in star-shaped arrangement. The filter may consist of two superimposed layers of filter cloth which may have different filter characteristics.

According to a further embodiment of the present invention there may be provided a filter having between two filter cloth layers a layer of tangled or felted textile fibers. The seams of the superimposed filter cloth layers may be in staggered arrangement to each other.

The short piece of pipe serving as hydraulic gas seal may simultaneously serve as counterweight subjecting the filter to tensioning. Like collars for attaching the upper part of the filter cloth to the bottom outlet flange of the gas inlet compartment and for attaching the lower part of said filter to the upper part of the gas-impermeable counterweight body may also be provided. Said collars may serve as liquid seals.

As stated above, the use of superimposed filter cloth fabrics as filtering elements considerably increases the efficiency of separation by increasing the area of contact between gas and liquid and particularly by eliminating preferential passages, inevitable with a single layer of fabric. In fact, by reason of the lower capillary pressure in the large pores, the gas preferentially passes through said large pores. When two or more layers of fabrics are superimposed and applied one on the other by the pressure of the gases, the statistical risk of having preferential passages face to face becomes negligible and the efficiency of separation may thus go beyond 90 percent to a value substantially equal to 100 percent

BRIEF DESCRIPTION OF THE DRAWING

In order that the invention may be more clearly understood, reference will now be made to the accompanying drawings, showing certain embodiments thereof by way of example, and in which.

DESCRIPTION OF THE PREFERRED EMBODIMENTS

Figure 1:
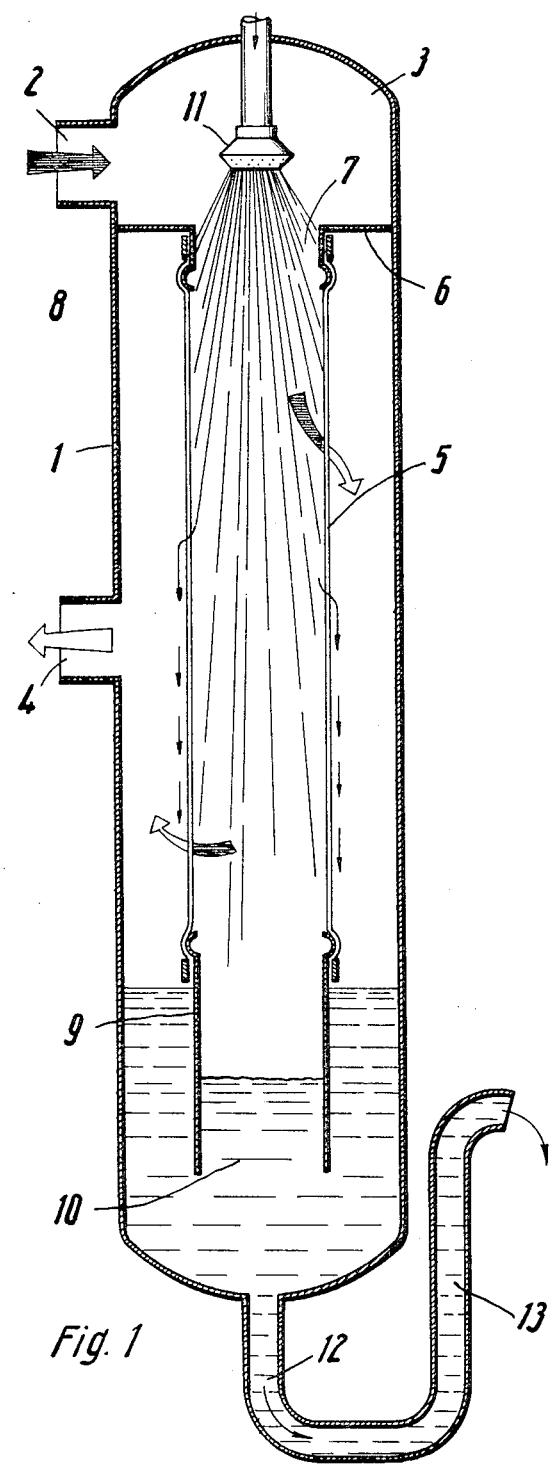
FIG. 1 shows an axial sectional view of a complete apparatus.

Referring now to the drawings, the embodiment of apparatus for filtering and placing gas and liquid in contact shown in FIG. 1 is essentially constituted by housing or casing 1 comprising gas inlet pipe 2, distribution chamber 3 located in its upper part, and gas outlet pipe 4. One or more filtering elements 5 in the form of sleeves or bags are disposed inside casing 1 and are fixedly attached to carrying plate 6 by means of holding member 7 tightly holding the filtering elements 5 and of locking device 8. The lower part of the filtering sleeve or bag 5 is attached in the same manner to member 9 which may or may not be open at its lower end and which is immersed in washing liquid 10 collected at the base of casing 1. One or more atomizers or pulverizers 11 are arranged in distribution chamber 3 vertically to the inlet of each filtering sleeve 5 or, if the atomization is fine, at gas inlet 2 in distribution chamber 3. Outlet 12 for discharging the washing liquid 10 emitted by atomizer 11 and collected in the lower part of housing 1 and overflow device 13 enable the liquid level in casing 1 to be maintained constant during operation.

Figure 2:
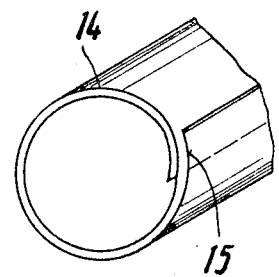
FIG. 2 shows a detail of a filtering element.

The, or each filtering sleeve may be made within a single thickness of fabric (not shown in the drawings) or by winding the fabric in two or more layers 14 as shown in FIG. 2. In this case sleeve 5 has a seam 15, but this seam may be replaced by any other means for joining the fabric layers, for instance, by glueing or cementing.

Figure 3:
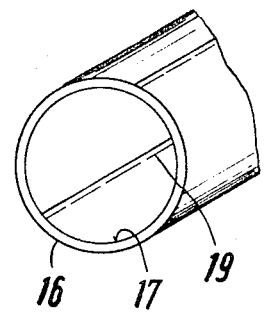
FIG. 3 shows another kind of filtering element in the form of a sleeve or tube.

Another type of filtering sleeve 5 is shown in FIG. 3. In this case two or more separate filtering sleeves 16, 17 are superimposed in such a manner that intimate contact of the fabric layers is achieved. Thereby care must be taken not to arrange seams 18, 19 face to face but in staggered position so as to diminish the risk of formation of a preferential passage at the seams.

Figure 4:
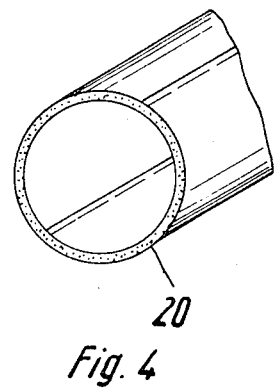
FIG. 4 shows another embodiment of filtering sleeve incorporating fibers.

FIG. 4 shows another embodiment of the filtering sleeve, which differs from that of FIG. 3 by the interposition between each layer of fabric of a layer of agglomerated felt or tangled fibers 20. This latter type of sleeve is intended for use when the gas-liquid contact must be as complete as possible.

The embodiments of FIGS. 3 and 4 enable various layers of fabrics of different characteristics to be used, thus in certain cases improving the efficiency of separation due to the resulting reduction of the loss in pressure.

Figure 5:
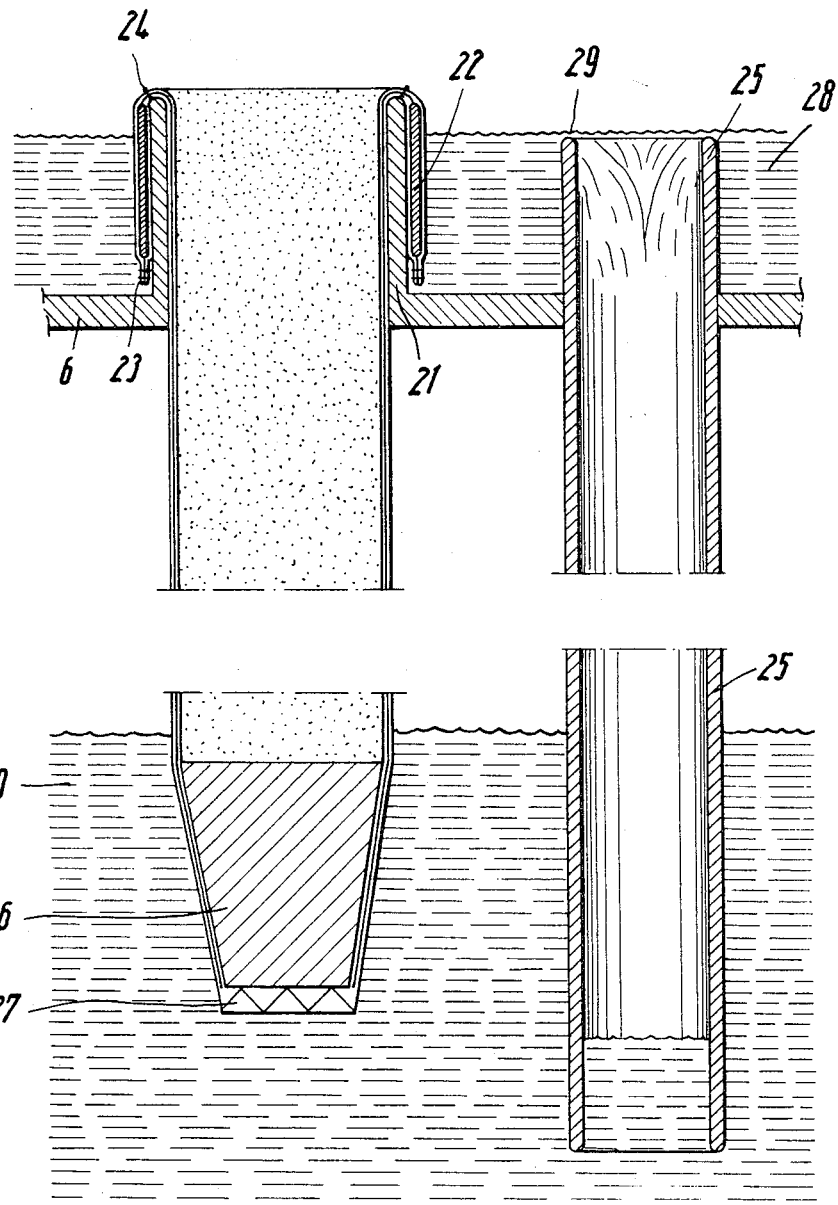
FIG. 5 shows a means for tensioning the filtering element in the form of a sleeve.

Other types of attaching and fixing means and devices for tensioning the filtering sleeves have been developed for such an apparatus, one of them being shown in FIG. 5.

This type of attachment comprises cylindrical socket 21 securely connected to plate 6. Filtering sleeve or bag 5 shown in FIG. 5 with a double layer of fabric, comprises cylindrical collar 22 held between two layers of fabric by means of two seam lines 23, 24. The dimensions of collar 22 are such that the high fold of filtering sleeve 5 exactly fits socket 21 connected to sleeve-carrying plate 6. This device is completed by the provision of overflow 25 passing through plate 6.

According to another version of a satisfactory device for tensioning and closing the lower end of sleeve 5, there is provided tensioning body or counterweight 26 the shape of which corresponds to that of the lower end of sleeve 5. Said body is shown in FIG. 5 in frustoconical form. The effect of tension of said body is reinforced by the differential pressure exerted on its upper face. The lower part of bag 5 or its base is sewn together at its lower end 27 and may comprise lateral folds so as to give it, for instance, the shape shown in FIG. 5.

The operation of the gas-liquid contacting apparatus, forming the subject of the present invention, is very simple. The gas to be purified enters into the filter through inlet pipe 2 and is distributed inside filtering sleeve or sleeves 5. Atomizer or pulverizer 11 in the upper part of chamber 3 uniformly distributes the water or washing liquid over the internal surface of sleeve or sleeves 5 so as to completely and continuously covering the same during filtration. The liquid passes through sleeve 5 from the inside to the outside due to the fact that it is carried along by the gas to be purified which is displaced in the same direction. The simultaneous passage of gas and washing liquid through the fabric permits complete separation of the micromist and may also be used for all other chemical and physical exchange processes between a gas and a liquid.

After active separation within the fabric has been effected, the gas escapes through pipe 4 and liquid 10 is collected at the bottom of casing 1 and is discharged through outlet 12 with the aid of overflow pipe 13.

Gas-impermeable member 9 effects sealing of the lower part of filtering sleeves by permitting formation of an hydraulic seal as shown in FIG. 1 by the illustrated difference in the water level. In fact, the pressure inside sleeves 5 is greater than that on its outside due to the drop in pressure caused by the passage of the gas through the fabric. Providing member 9 has the additional advantage of enabling the discharge of solid particles which may have been deposited on the inside surface of sleeves 5.

Attachment of the upper part of sleeve 5 in the manner shown in FIG. 5 is of advantage as it permits rapid removal and reinstallation of sleeve 5. This advantage is particularly useful for apparatus having a large number of filtering sleeves 5. The removal operation consists in simply lifting movable collar 22 by sliding it over fixed socket 21.

Tight attachment of the upper part of sleeve 5 is improved by providing liquid layer 28 fed by atomizer 11 which causes moistening of sleeves 5. Thereby level 29 of said liquid layer is regulated and adjusted by overflow 25 so as to cause immersion of the folded part of sleeve 5 into liquid 28 without liquid 28 reaching the inlet opening of sleeve 5 and flowing thereinto.

The lower part of filtering sleeve 5 of the type shown in FIG. 5 is immersed in liquid 30 contained in the lower part of housing 1 of the apparatus to such an extent that the lower seams are immersed thereinto, thus limiting the risk of any direct passage of the gas therethrough.

Overflow 25 also dips into liquid 30 and its lower part forms an hydraulic seal thus also preventing any direct passage of gas therethrough.

The textile fabric of which the filtering element is composed may be any type of fabric used in heretofore known cloth filters, such as cotton in the form of osnaburg, drill, sateen, or wool, glassfiber, nylon, in the form of tackle twill, sailcloth, and other suitable materials, for instance, plastic-like fiber materials including polypropylene.

The felt and tangled fibers used as intermediate layer between two layers of fabric may be wool, glass wool, or plastic wool.

In place of using water as washing and moistening liquid, there may be used any kind of liquid capable of completely wetting the woven fabric of the filtering elements. The composition of the washing liquid depends upon the mist to be removed from the gas or the purpose to be achieved by the washing and filtering process of this invention.

The process has proved of great value, for instance, in the cleaning of sulfuric acid mist, phosphoric acid mist, hydrofluoric acid mist, and other chemical mists, and the like.

The apparatus according to the present invention may consist of any suitable material depending on the nature of the carrier gas and the aerosol to be separated. Thus the apparatus may be made of steel, stainless steel, rubber-protected steel, other metallic material, plastic material, and others.

The textile fabric composing the filtering element may also be made of various fiber material depending upon the nature of the suspension to be treated. Polypropylene fiber material has proved to be specially suitable for acidic gases.

Other materials and especially fabrics made of polyester or polyacrylic fibers may, of course, also be used. These fiber materials may also be employed as felted or tangled fibers used as intermediate layer between the two layers of fabric.

Although water is used as suitable washing liquid, aqueous solutions of the fine mist to be separated from the carrier gas such as dilute acids and the like may be employed as washing liquid. For instance, to remove a fine mist of phosphoric acid from a carrier gas, the most suitable washing liquid will be a phosphoric acid solution.

The following examples serve to illustrate the present invention without, however, limiting the same thereto.

EXAMPLE 1

The starting gas is air containing about 2.3 g. of hydrochloric acid per cu. m. in the form of a fine mist of a size of a few hundredths of a micron. It is passed through the above described apparatus which consists of polyvinylchloride and is provided with a single filter cloth filter of rhovyl textile fabric. The apparent speed of passage of the gas through the apparatus is about 0.92 cm./sec., the rate of sprinkling the filter cloth, i.e., the amount of water sprayed upon the filter cloth continuously during filtration is about 0.65 kg. of water for each cu.m. of gas to be treated. The purified gas leaving the apparatus through outlet 4 contains only 18 mg. of hydrochloric acid per cu.m. Thus 99.3 percent of the hydrochloric acid present in the gas is removed therefrom by means of the apparatus and process according to the present invention. The difference in pressure between the wash liquid level in housing 1 outside filtering sleeve 5 and inside said filtering sleeve 5 is between about 250 mm. and about 400 mm. depending upon the speed of filtration. "Rhovyl" is a polyvinylchloride fabric.

EXAMPLE 2

The starting gas is a waste gas discharged from a phosphoric acid concentrating apparatus which contains between 4 g. and 6 g. of phosphorous pentoxide, between 2 g. and 5 g. of sulfur trioxide, and about 0.1 percent of hydrofluoric acid per cu.m. of gas. The apparatus is made of rubber-coated steel, the filtering element consists of a double filter cloth layer of polypropylene fiber material. The apparent speed of filtration is about 2.2 cm./sec. The amount of water sprinkled into the gas and onto the inner filter cloth layer is about 2.6 kg./cu.m. of gas. The amount of acids in the gas outlet is about 60 mg./cu.m. Thus the overall efficiency of the filter is 99.0 to 99.5 percent and the purified gas is substantially colorless. Such a result has not been achieved heretofore with any of the known processes and apparatus.

Figure 6:
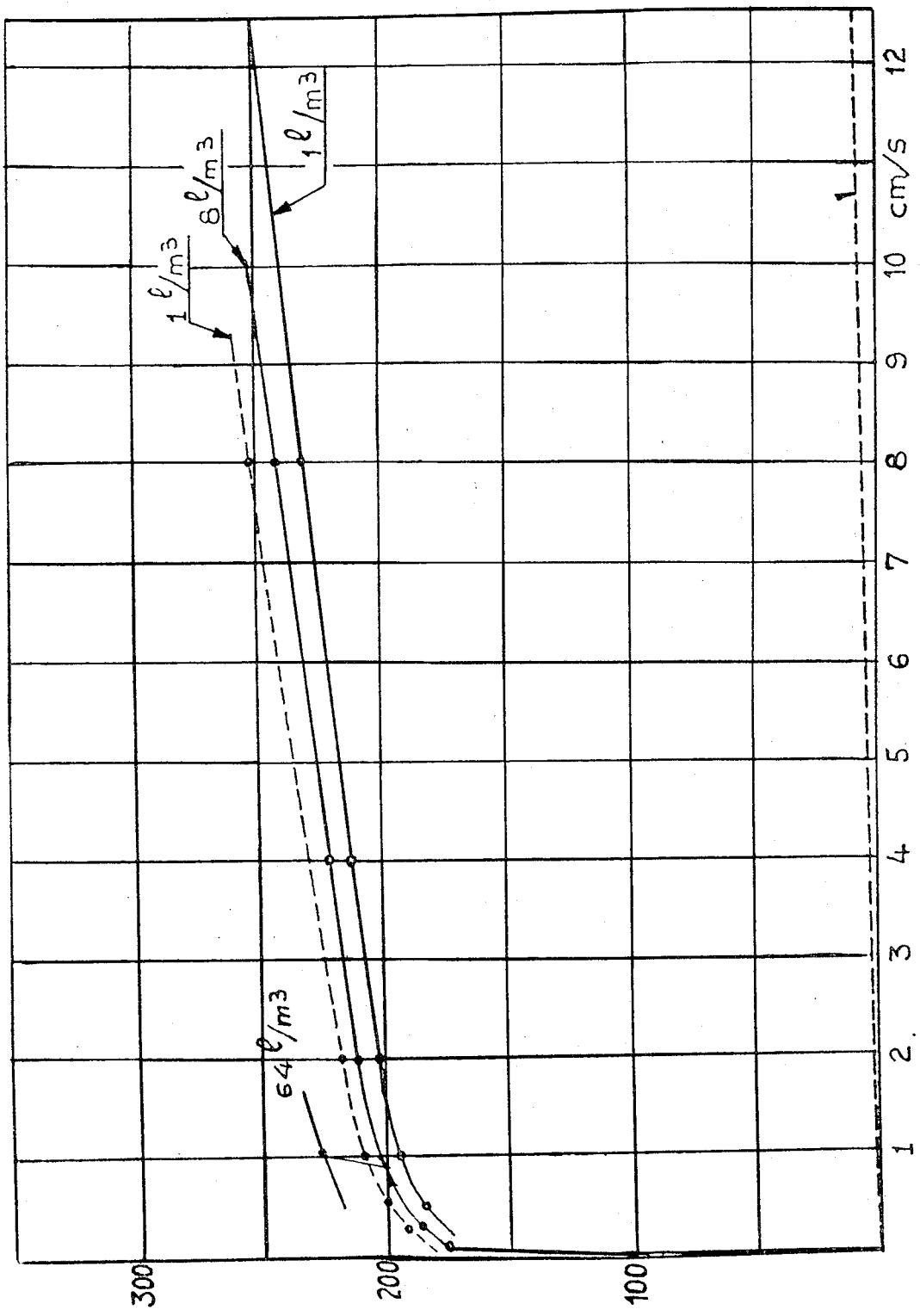
FIG. 6 shows curves illustrating the loss of head as a function of the speed of filtration when using a single filter cloth layer.

FIG. 6 shows curves illustrating the loss of head as a function of the speed of filtration. In said FIG. 6 the abscissa indicates the apparent speeds V of passage of the air through the cloth while the ordinate indicates the loss of head $\Delta p$ in mm. water column. The speeds plotted on the abscissas are apparent values, i.e. values obtained by dividing the rate of flow of gas by the total surface of the filter cloth. Thus these values are concerned with speeds at which the gases reach the filter cloth and which are substantially lower than the actual speeds through the pores of the filter cloth.

These curves show a. that the sprinkling of the filter cloth has the effect of substantially decreasing the cross-section of the pores as is evident from the very considerable difference between the loss in head of dry filter cloth and that of sprinkled filter cloth; at the same filtration rate, the ratio is of the order of 1 : 50.

b. It is noted that the loss in head increases relatively slowly as the apparent rate of filtration increases; an increase in the apparent rate of 500 percent, that is to say from 2 cm./sec. to 10 cm./sec., results in an increase in the loss of head of only 25 percent, namely from 200 mm. to 250 mm. water column. The law of variation of the loss of head, therefore, differs significantly from the laws of variation of the loss of head of a cloth used for intercepting dusts, which generally follows the law of the squares of the gas flow.

This phenomenon may be explained in the following manner:

The fibers and threads of the cloth become covered with a liquid film the thickness of which is determined by the capillary laws on the one hand and by the kinetic pressure of the gas on the other hand. Therefore, as the flow of gas through the filter increases, the liquid film retained by capillary action is flattened and the pores increase in dimensions; the real rates through the pores, therefore, increase only very slowly, resulting in a very slow increase in the loss of head as a function of the apparent velocities of the gases.

The assembly according to the present invention consisting of the filter cloth plus the liquid film thus behaves like a liquid microsieve with openings variable with the rate of flow of gas.

Experience has furthermore shown that the efficiency in intercepting liquid mists by sleeves of a single filter cloth remains very high within the limit of the speeds of filtration ranging from 0.3 cm./sec. to 3 cm./sec.; it attains its optimum in this experiment between a speed of 1 cm./sec. and of 1.5 cm./sec. and it declines progressively beyond said speed. Enlargement of the pores by the flattening out of the liquid film is a partial explanation of this decrease in effectiveness. It can also be attributed to the fact that the pores of a filter cloth are not of uniform dimensions and that preferential passages are formed which exert an unfavorable influence on the efficiency at high speeds.

Therefore, a filtering element composed of sleeves of double filter cloth was tested and it was found that the efficiency remained very high for rates of filtration ranging from 2 cm./sec. to 10 cm./sec., this efficiency decreasing only beyond said rates. This finding permits to substantially reduce the surfaces and the prices of the filtering element by using sleeves of double filter cloth instead of a single filter cloth. This improvement in the behavior of the double-filter cloth filtering element may be explained as follows:

a. The pores of the two filter cloths are never completely aligned face to face and, therefore, irregularities in the dimensions of the pores do not have the same effect as when using a single filter cloth.

b. A stable liquid film improves the quality of the liquid microsieve which is formed between the two filter cloths.

The use of sleeves of double filter cloth, therefore, constitutes an economic advance over sleeves of single filter cloth.

Figure 7:
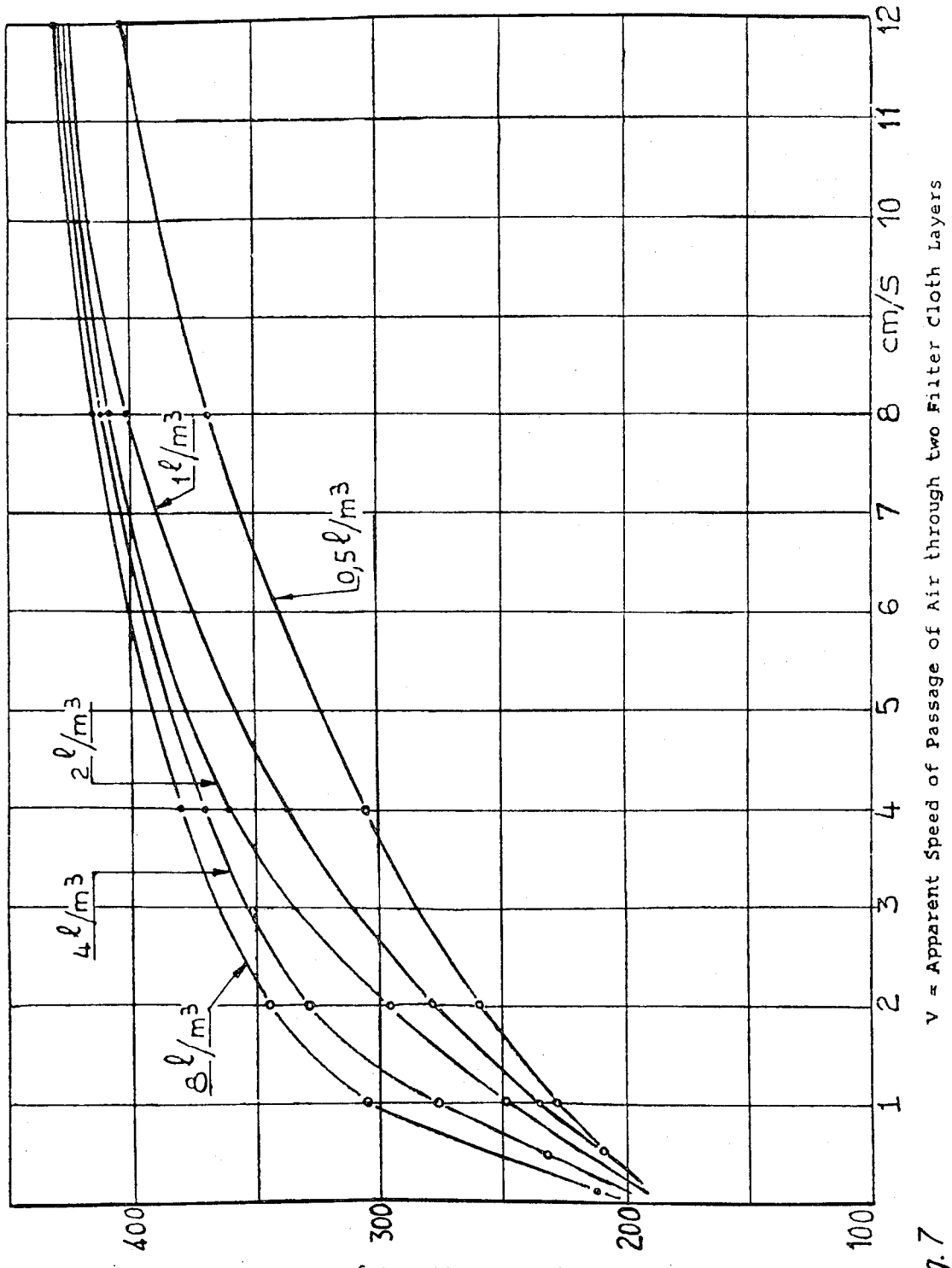
FIG. 7 shows curves illustrating the loss of head as a function of the speed of filtration when using a double filter cloth layer.

FIG. 7 illustrates the characteristics of the loss of head of a double filter cloth filtering element as a function of the apparent speeds; these losses in head are obviously higher than those of a single filter cloth.

In FIG. 7 the abscissa indicates the apparent speed of passage V of the air through the double layer filter cloth filtering elements and the ordinate the loss of head $\Delta p$ in mm. water column. In FIGS. 6 and 7 the lowest curves show the loss of head when using a dry filter cloth while the other curves show the loss of head with varying amounts of water used for spraying the filter cloth and ranging from 0.5 kg./cu.m. of gas to 8 kg./cu.m. of gas.

The theory is advanced, although the invention is not limited to such a theory, that even when using two superposed filter cloth filters of the same textile fabric and arranging the filter cloth filters adjacent to each other, the continually and thoroughly wetted inner filter exhibits other filtering characteristics than the outer filter which is not directly sprayed with the wetting liquid. The reasons therefore are as follows:

a. Due to the inner filter being continually sprayed and wetted, its fibers undergo a certain amount of swelling whereby the width of their pores is diminished. In contrast thereto the outer filter which is not directly sprayed and wetted changes the width of its pores only slightly. Thus the two filters exhibit different filter characteristics when the inner filter is thoroughly and continually wetted.

b. As stated hereinabove there is formed, due to continually and thoroughly wetting the inner filter, a skin-like filtering layer which extends over and covers the pores and serves as a microsieve. The formed thin filtering skin is continuously torn apart, thereby enclosing the micromist particles, and is continuously reformed. Thus there are continually formed two filtering layers of different filtering characteristics and properties.

Of course, many changes and variations in the arrangement of the gas distribution compartment, the inlet means for the gas to be purified, the outlet means for the purified gas, the filtering elements and their composition, the moistening device for supplying washing liquid to the filtering elements, and the like may be made by those skilled in the art in accordance with the principles set forth herein and in the claims annexed hereto.

I claim:

1. In an apparatus for separating micromist of industrial origin from a carrier gas, said apparatus comprising a housing having upper and lower ends, a plate with a central opening therein and extending horizontally in said housing beneath its upper end forming a distribution chamber above said plate, a mist-laden carrier gas inlet in said housing opening into said chamber, at least one filtering element extending vertically in said housing beneath said plate, means removably securing the upper end of said filtering element to said plate around its central opening, a gas outlet in said housing intermediate the upper and lower ends of the filtering element, spray means extending into said distribution chamber for delivering washing liquid to the interior of said filtering element through said plate opening simultaneously and continually with the gas, means at the lower end of said housing for maintaining a predetermined level of collected washing liquid and mist below the lower end of said filtering element, and a gas impermeable member secured to the lower end of said filtering element and extending into the collected liquid to maintain a hydraulic seal so that the carrier gas will pass only from the inside to the outside of said filtering element, the improvement which consists in providing at least one filtering element of filter cloth, said filtering element being continuously provided with a continuous film of washing liquid forming a microsieve.

2. The apparatus of claim 1, in which said filtering element is comprised of two concentrically superimposed layers of filter cloth material.

3. The apparatus of claim 1, in which the means removably securing said filtering element to said plate includes an upstanding annular socket around said plate opening, the upper end of said filtering element being folded over and around said socket.

4. The apparatus of claim 3, additionally comprising an overflow pipe passing through said plate terminating below the upper end of said socket so that liquid level is established and maintained, whereby the washing liquid continuously wets said filtering element around said socket.

* * * * *